US012410078B2

(12) United States Patent
Vadivel et al.

(10) Patent No.: US 12,410,078 B2
(45) Date of Patent: Sep. 9, 2025

(54) DATA-DRIVEN RECIRCULATING AQUACULTURE SYSTEM

(71) Applicant: The Florida State University Research Foundation, Inc., Tallahassee, FL (US)

(72) Inventors: Ashwin Vadivel, Tallahassee, FL (US); Olugbenga Moses Anubi, Tallahassee, FL (US)

(73) Assignee: THE FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 441 days.

(21) Appl. No.: 18/059,816

(22) Filed: Nov. 29, 2022

(65) Prior Publication Data

US 2023/0166993 A1    Jun. 1, 2023

Related U.S. Application Data

(60) Provisional application No. 63/283,692, filed on Nov. 29, 2021.

(51) Int. Cl.
*C02F 3/00*    (2023.01)
*A01K 63/04*    (2006.01)
(Continued)

(52) U.S. Cl.
CPC ............ *C02F 3/006* (2013.01); *A01K 63/042* (2013.01); *C02F 3/08* (2013.01); *C02F 3/282* (2013.01); *C02F 2103/20* (2013.01); *C02F 2209/006* (2013.01); *C02F 2209/06* (2013.01); *C02F 2209/07* (2013.01); *C02F 2209/22* (2013.01); *C02F 2209/36* (2013.01); *C02F 2209/38* (2013.01); *C02F 2301/046* (2013.01)

(58) Field of Classification Search
CPC ... A01K 63/04; A01K 63/042; C02F 2103/20; C02F 3/006; C02F 3/302; C02F 2209/40; C02F 3/08; C02F 3/085; C02F 3/282; C02F 2209/006; C02F 2209/07; C02F 2209/22; C02F 2209/36; C02F 2209/38; C02F 2301/046
USPC ............................ 210/630, 170.02; 119/227
See application file for complete search history.

(56) References Cited

U.S. PATENT DOCUMENTS

2005/0061737 A1 * 3/2005 Linden ................... C02F 3/302
                                                          210/903
2007/0163952 A1 * 7/2007 Schreier ................. A01K 63/04
                                                          210/605

FOREIGN PATENT DOCUMENTS

WO    WO-9749279 A1 * 12/1997 ............. A01K 61/80
WO    WO-2010142004 A2 * 12/2010 ............. A01K 63/04

* cited by examiner

*Primary Examiner* — Claire A Norris
(74) *Attorney, Agent, or Firm* — Eversheds Sutherland (US)

(57) ABSTRACT

A recirculating aquaculture system (RAS) is disclosed, which includes a main tank, in which fish or shellfish are farmed; a first reactor fluidically connected to the main tank, wherein the first reactor is a batch reactor that operates under anoxic conditions; a second reactor fluidically connected to the main tank, wherein the second reactor is a moving bed biofilm reactor (MBBR); a feed stream fluidically connected to the main tank; and a data-driven controller operably connected to the first reactor, the second reactor, and the feed stream, wherein the data-driven controller is configured to bring and maintain the system (RAS) at a desired state.

15 Claims, 5 Drawing Sheets

(51) Int. Cl.
*C02F 3/08* (2023.01)
*C02F 3/28* (2023.01)
*C02F 103/20* (2006.01)

DATA-DRIVEN RECIRCULATING AQUACULTURE SYSTEM

CROSS-REFERENCE TO RELATED APPLICATION

This application claims priority to U.S. Provisional Patent Application No. 63/283,692, filed Nov. 29, 2021, which is incorporated herein by reference.

BACKGROUND

Recirculating aquaculture systems (RAS) are systems in which fish or shellfish are farmed in a closed-circuit, indoor tank with a small footprint. RAS provide many benefits to fish or shellfish farming, including ease of feeding and harvesting and low overall water usage. Since RAS are closed-circuit, filtering the water is necessary during recirculation of the water so that waste products, chemicals such as ammonium and nitrogen, and the oxygen/carbon dioxide balance is maintained at optimal levels for fish and/or shellfish growth.

About 50% of all feed delivered to RAS ends up as waste solids in culture water. The waste solids are characterized as "suspended" or "settleable"; solids that can settle to the bottom within 30 minutes are classified as settleable, while the remaining solids are classified as suspended solids.

Conventional methods of treating waste nitrogen and solids in RAS largely utilize clearwater RAS or biofloc systems.

Clearwater RAS

Clearwater RAS involve using an external biofilter for nitrifying bacteria and filters for solids removal from the water. Waste nitrogen is generated in clearwater RAS as ammonia is oxidized to nitrite and oxidized again to nitrate. Thus, clearwater RAS are generally reliable and easier to control, but they are equipment-intensive and will accumulate nitrate over time. Even small concentrations of ammonia or nitrite are toxic to culture species. However, nitrate can be present in larger quantities of 20-100 mg/L and will lead to growth of algae.

Although ammonia and nitrite are oxidized in the presence of oxygen, the process of nitrate reduction happens much more efficiently in an anoxic environment—one without dissolved oxygen. If nitrate accumulates to high enough levels, it can stunt growth and even prove fatal to culture species. Clearwater RAS do not typically have an efficient anoxic treatment system because the cultured species need high dissolved oxygen levels which would require a separate denitrification system with an anoxic environment. Furthermore, clearwater RAS use more water than biofloc systems because of the need to perform periodic water exchanges to rid the system of excess nitrate and other pollutants.

Biofloc Systems

In contrast to clearwater RAS, biofloc systems incorporate waste nitrogen and solids into flocs by manipulating the carbon-to-nitrogen (C/N) ratio in the same culture water used to raise the cultured species. The "flocs" or "bioflocs" are then consumed by omnivore species that can tolerate high solids such as tilapia or shrimp. In general, water from biofloc systems has a brown or murky appearance and has higher turbidity compared to clearwater RAS. Biofloc systems typically only have a solids filter for capturing large particles and instead mainly rely on the biofloc to treat the culture water. Although cheaper and easier to implement, biofloc systems can suffer catastrophic crashes if the microbial biofloc is disrupted with disease, competing bacterial species, or poor water quality.

Biofloc systems usually need zero water exchange because their microbial community can quickly assimilate the produced waste into biomass. However, to sustain the biofloc, the water must be continuously supplemented with a carbon source to maintain a high C/N ratio as well as continuously aerated with dissolved oxygen. Carbon supplements and continuous oxygen aeration increase energy costs. The system also must be closely monitored as changes in the biofloc community must be detected fast to administer remedial treatments, although these treatments are notoriously unsuccessful.

Biofloc systems are usually be able to convert nitrate in the system into biomass so they typically do not see an accumulation in nitrate. Furthermore, since biofloc systems do not involve recirculation of water, biofloc systems cannot be used with many sensitive cultured species (ex: trout, salmon, catfish) due to their low tolerance for suspended and settleable solids in the culture water. Biofloc systems are also prone to fail without close monitoring and do not have a dedicated space to treat water that is separated from the culture species. If a problem is detected in a biofloc system, it is often too late.

Detritivores like shrimp and tilapia can survive in high concentrations of solids—up to 400 mg/L suspended and 10-50 mg/L settleable solids. In fact, they also use the solid biofloc as a food source. Meanwhile, more sensitive species like trout or salmon can only handle small amounts of solids—only up to 20 mg/L suspended solids and zero settleable solids.

It therefore would be desirable to provide improved aquaculture systems providing the controllability and reliability characteristic of a clearwater RAS while maintaining the inexpensive and easy-to-use nature of a biofloc system.

BRIEF SUMMARY

In one aspect, a recirculating aquaculture system (RAS) is disclosed, which includes a main tank, in which fish or shellfish are farmed; a first reactor fluidically connected to the main tank, wherein the first reactor is a batch reactor that operates under anoxic conditions; a second reactor fluidically connected to the main tank, wherein the second reactor is a moving bed biofilm reactor (MBBR); a feed stream fluidically connected to the main tank; and a data-driven controller operably connected to the first reactor, the second reactor, and the feed stream, wherein the data-driven controller is configured to bring and maintain the system (RAS) at a desired state. The RAS may further include at least one sensor in at least one of the main tank, the first reactor, and the second reactor configured to measure at least one of pH, oxygen reduction potential (ORP), dissolved oxygen (DO), temperature, feed concentration, mass+protein content, oxygen uptake rate (OUR), ammonia, nitrite, nitrate, phosphate, COD levels, levels of biofloc in the first reactor, levels of biofilm in the second reactor, and/or feed input, wherein the at least one sensor is operably connected to the data-driven controller.

In another aspect, a method is provided for operating a recirculating aquaculture system (RAS) including: farming fish or shellfish in a main tank, which has a feed stream fluidically connected thereto; operating a first reactor under anoxic conditions, the first reactor being fluidically connected to the main tank; operating a second reactor, which is a moving bed biofilm reactor (MBBR) fluidically connected to the main tank; and operating a data-driven controller connected to the first reactor, the second reactor, and the feed stream, to bring and maintain the system (RAS) at a desired state.

BRIEF DESCRIPTION OF THE DRAWINGS

The detailed description is set forth with reference to the accompanying drawing illustrating an example of the disclosure, in which use of the same reference numerals indicates similar or identical items. Certain embodiments of the present disclosure may include elements, components, and/or configurations other than those illustrated in the drawing, and some of the elements, components, and/or configurations illustrated in the drawing may not be present in certain embodiments.

DETAILED DESCRIPTION

A data-driven recirculating aquaculture system (RAS) is disclosed. In particular, a RAS with a data-driven control strategy is provided that advantageously may improve growth rate of cultured species (ex: shrimp, tilapia), minimize required feed, reduce water consumption by improving waste removal from recirculating water, and provide robustness against uncertainty and disturbances.

The present RAS may require limited or no human supervision because the control strategy may be exclusively autonomous other than the need for periodic maintenance. The system is dynamic and can track desired setpoints. The control strategy is built on system identification from measurements of various parameters and system states within the RAS such as visual data, pH, oxygen reduction potential (ORP), dissolved oxygen, temperature, feed concentration, mass and protein content, oxygen uptake rate, ammonia, nitrite, nitrate, phosphate, COD levels, biofloc in the first reactor, biofilm in the second reactor, and/or feed input. Once an accurate model of the RAS is obtained, the RAS can be controlled to produce the desired behavior. Previous RAS or biofloc systems do not offer similar levels of control.

For example, by adjusting to optimal biofilter performance, the system can identify and diagnose impending failures before issues are detectable visually and/or before the system is damage. In embodiments, the RAS can improve food production, biosecurity, reduce water consumption, reduce required feed or energy expenditure, and improve health and growth of the cultured species.

In embodiments, the RAS provides appropriate amount of feed to cultured species calculated using at least some of the parameters or system states, and creates culture water with desired concentrations of waste compounds. These desired concentrations of waste may not be zero depending on the plants or algae for which the culture water is intended.

Examples of suitable applications for the RAS include, but are not limited to, small scale aquaculture seafood production, commercial aquariums, aquatic organism breeding, home aquariums/pond keeping, public aquariums (hotels, restaurants) pet stores, and environmental water purification.

The RAS

Figure 1:
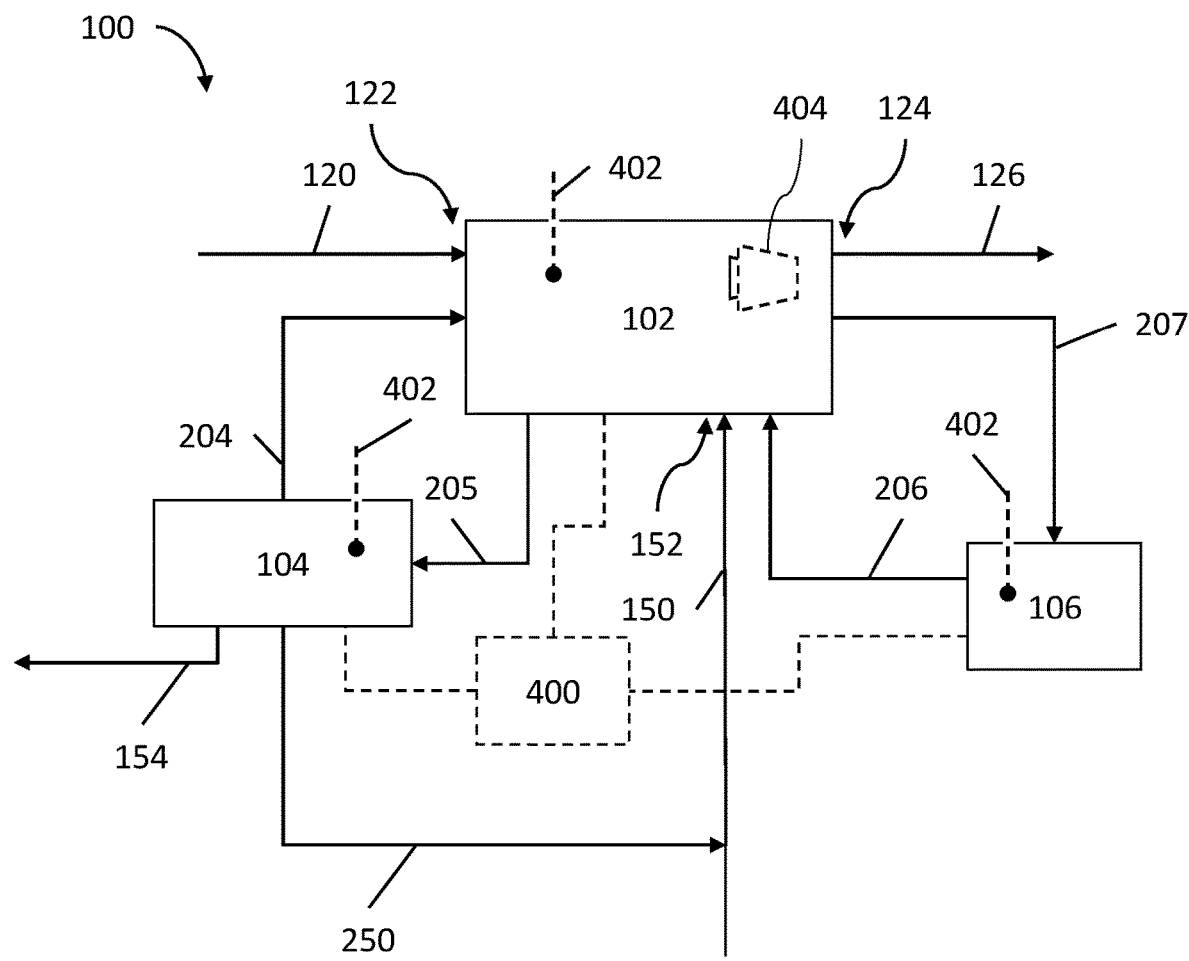
FIG. 1 is a schematic of a recirculating aquaculture system (RAS) in accordance with one embodiment of the present disclosure.

One embodiment of an RAS is illustrated in FIG. 1. The RAS 100 has a main tank 102, a first reactor 104, wherein the first reactor is either an anaerobic suspend growth reactor or a sequencing batch reactor (SBR), and a second reactor 106, wherein the second reactor is a moving bed biofilm reactor (MBBR). The RAS 100 further includes inlets and outlets for flow-through water change 120, sludge wasting 154, biofloc recycling 250, and/or a feed stream 150. The RAS 100 is controlled in real-time using data-driven (including machine learning) algorithms.

In some embodiments, a data-driven controller 400 implements an intelligent and real-time data-driven control strategy is used to monitor and control the biofloc population in the first reactor 104, to monitor a feed given to cultured species in the main tank 102, and to make high-level control decisions. The RAS 100 is designed to track specified concentration setpoints for target compounds by carefully altering the biofloc's treatment efficiency. The RAS 100 is configured to remove waste from the RAS 100 by monitoring and controlling biofloc in the first reactor 104, biofilm in the second reactor 106, feed input and the main tank 102. The RAS 100 further utilizes sensors to obtain estimates of concentrations of harder to measure target parameters in the system such as, but not limited to, ammonia, nitrate, nitrite, chemical oxygen demand (COD), and phosphate.

Multiple sensors 402 are used to measure several parameters including, but not limited to, pH, ORP, dissolved oxygen, and temperature in the RAS. The measurements may be taken in the main tank 102, first reactor 104, and/or the second reactor 106. Cameras 404 supplement the sensors 402 to provide visual data to assist with control. Desired conditions are given as input to the RAS 100. In some embodiments, these desired conditions are set levels of nitrate, phosphate, or COD in the first reactor 104, levels of ammonia or nitrite in the second reactor 106, and/or any of the foregoing levels in the main tank 102. The data-driven controller will execute a real-time control strategy to approach and stabilize the RAS 100 at the desired state. Feeding of the cultured species is calculated and performed by the system to promote healthy growth of the cultured species while avoiding waste buildup from uneaten feed and excrement.

The RAS 100 creates culture water with controlled nitrate levels or other target levels. The RAS 100 can easily be added to an aquaponics or hydroponics system to match plant growth needs with waste nitrate produced by cultured aquatic species.

System Inputs and Outputs

In some embodiments, the RAS 100 has an inlet 122 for flow-through water change input 120 and an outlet 124 for the flow-through water change output 126. The flow-through water change 120 allows for the RAS 100 to have water added to the system or allows water to be taken out of the system. As an example, the flow-through water change system can connect to an aquaponics system to provide culture water with a controlled nitrate level.

In some embodiments, the RAS 100 has an inlet 152 for a feed stream 150 to enter the RAS 100. The feed stream 150 contains feed such as biofloc for the system. The feed stream 150 combines with a biofloc recycling stream 250 to provide feed to the main tank 102. The term "stream" refers to the actual transferred material therein. The biofloc is then consumed by chosen organisms in the main tank 102.

In some embodiments, the RAS 100 has an outlet for the solids and waste to exit the RAS 100 via a sludge wasting stream 154. The outlet extends from the first reactor 104.

Novel data-driven control algorithms control the system from measurement data acquired from the sensors 402. As a result, the RAS is efficient and can maximize growth of cultures species, allow greater stocking densities of cultured species, reduce water consumption, reduce required feed, and product effluent with desires levels of nitrate among other target parameters. The nitrate production specifically can be sized to accommodate plant needs in an aquaponics operation.

The RAS can be adapted to both freshwater and saltwater systems, and can be installed in any RAS that houses a culture species that requires stable water parameters. Thus, the system is modular and adaptable. An intelligent control strategy can be constructed from measurement data to optimize the waste removal ability of the biomass and to track reference setpoints which can be sized appropriately to feed plants in an aquaponics or hydroponics operation. The purpose of this design is to create a semi-automated method to continuously monitor and control aquaculture systems for maximum food production.

Main Tank

The main tank 102 is connected to the inlet 122, outlet 124, inlet 152, first reactor 104, and second reactor 106.

The main tank 102 is connected to the first reactor 104 in order to transfer both an inlet stream 204 from the first reactor 104 and an outlet stream 205 flowing to the first reactor 104. The outlet stream 205 contains waste, such as nitrate or other pollutants like as phosphate, which is transferred through the outlet to the first reactor 104 to react in batches. After batch reaction within first reactor 104, biomass or water with a lower nitrate or pollutant concentration is returned to the main tank 104 as the inlet stream 204.

The main tank 102 is connected to the second reactor 106 in order to transfer both an inlet stream 206 from the second reactor 106 and an outlet stream 207 to the second reactor 106. The main tank 102 transfers an outlet stream 207 with ammonia and nitrite to the second reactor 106. The main tank 102 then receives the inlet stream 206 of oxidized ammonia and nitrite (i.e., nitrite and nitrate).

In some embodiments, the main tank 102 has sensors 402 measuring several parameters including, but not limited to, pH, ORP, dissolved oxygen, and temperature.

The First Reactor

The first reactor 104 is connected to the main tank in order to transfer both an inlet stream 204 and an outlet stream 205. The first reactor 104 is either an anaerobic suspend growth reactor or sequencing batch reactor (SBR). This first reactor 104 is equipped with sensors 402 and dosing pumps to cultivate biofloc.

In some embodiments, the RAS 100 cultivates a suspended biofloc in a first reactor 104, wherein the first reactor is a batch reactor that is disconnected from the main tank 102 while the reactor is in-use. The first reactor 104, when it is a suspended growth reactor, may also be referred to as the anoxic reactor.

The biofloc in the first reactor is responsible for nitrate reduction while maintaining low chemical oxygen demand (COD) in the effluent water. The first reactor 104 works by treating water from the main tank 102.

An outlet stream 205 containing waste, such as nitrate or other pollutants like as phosphate, is transferred through the outlet to the first reactor 104 to react in batches. This outlet stream 205 is reacted with the goal of nitrogen and organic carbon removal, prevention of incomplete denitrification (too much nitrite) or over-extended denitrification (production of sulfides).

Further, the first reactor 104 maintains dissolves oxygen (DO) near 0 ppm by sparging $N_2/CO_2$. The first reactor 104 has sensors 402 to measure pH, ORP, and water temperature.

The RAS 100 can estimate target parameter concentrations by modeling system dynamics such as biofilm growth rates, denitrification rate, BOD and COD accumulation, or other factors. The target parameters in the first reactor 104 include nitrate, phosphate, and COD. These models can be improved with data-driven iterative optimization using machine learning. The RAS, using a trained mode, can have precise carbon dosing control to promote denitrification, and stop the reaction at the correct time for complete denitrification. The controls of the first reactor 104 include, but are not limited to, carbon source dosing, $N_2/CO_2$ sparge rate, batch length/influent retention time, solids retention time, stirrer speed, and pH dosing.

The RAS may use any of a variety of database models (e.g., relational model, object model, etc.) and may support any of a variety of query languages in order to bring and maintain the system at a desired state. The RAS may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like as part of a data-driven iterative optimization and machine learning schema.

Figure 5:
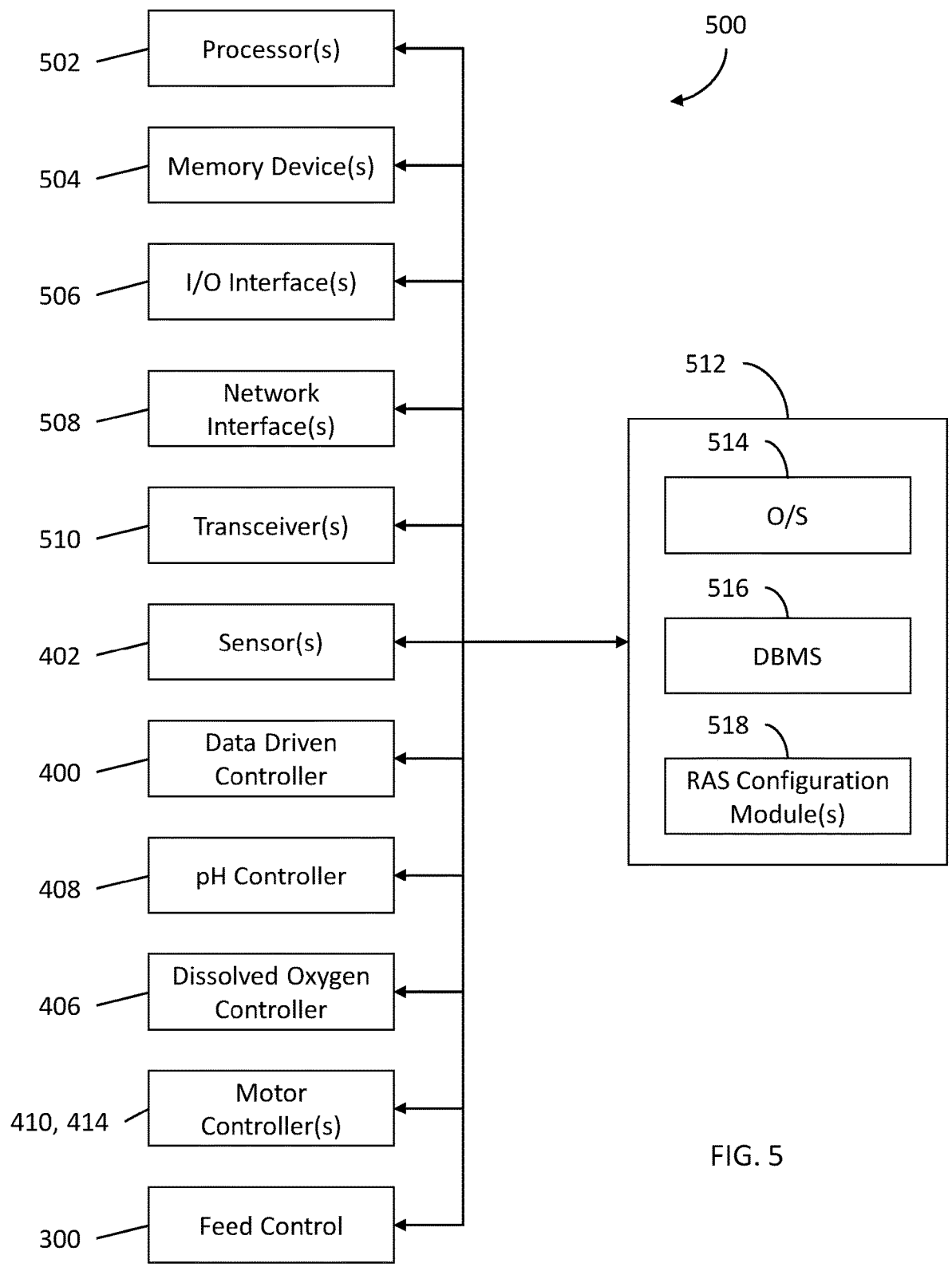
FIG. 5 is a schematic block diagram of a computing device in accordance with one embodiment of the present disclosure.

FIG. 5 is a schematic block diagram of one or more illustrative computing device(s) 500 in accordance with one or more example embodiments of the disclosure. The computing device(s) 500 may include any suitable computing device including, but not limited to, a server system, a mobile device such as a smartphone, a tablet, or the like; a desktop computer; a laptop computer; or the like. The computing device(s) 500 may correspond to an illustrative device configuration for any of the computing systems described herein and/or any other system and/or device.

In some embodiments, the RAS includes one or more computing device(s) 500, which may have one or more processors 502, one or more memory devices 504, one or more input/output (I/O) interfaces 506, one or more network interfaces 508, one or more transceivers 510, and the like. The one or more computing devices and the subcomponents therein may be configured to communicate with the sensors 402, the data-driven controller 400, pH controller 408, dissolved oxygen controller 406, motor controllers 410, 414, feed control 300, and the like.

The computing device(s) 500 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device(s) 500 may include one or more processors (processor(s)) 502, one or more memory devices 504 (generically referred to herein as memory 404), one or more input/output (I/O) interfaces 506, one or more network interfaces 508, one or more sensors or sensor interfaces 402, one or more transceivers 510, and data storage 512. The data storage 512 may store one or more operating systems (O/S) 514; one or more database management systems (DBMSs) 516; and one or more program module(s), applications, engines, computer-executable code, scripts, or the like such as, for example, one or more drive bypass module(s) 518, which may include RAS configuration modules. Some or all of these module(s) may be sub-module(s). Any of the components depicted as being stored in the data storage 512 may include any combination of software, firmware, and/or hardware. The software and/or firmware may include computer-executable code, instructions, or the like that may be loaded into the memory 504 for execution by one or more of the processor(s) 502. Any of the components depicted as being stored in the data storage 512 may support functionality described in reference to corresponding components named earlier in this disclosure Once the outlet stream 205 has reacted in batches in the first reactor 104, the reacted product goes back to the main tank 102 as the inlet stream 204. The solids and biofloc left in the first reactor 104 is divided into two streams. The first stream is a sludge wasting stream 154. Reacted biofloc that is determined to be further unusable, excess biofloc, or biofloc containing other pollutants are removed via the sludge wasting stream 154. The second stream is the biofloc recycling stream 250, which provides feed to the main tank 102.

Figure 3:
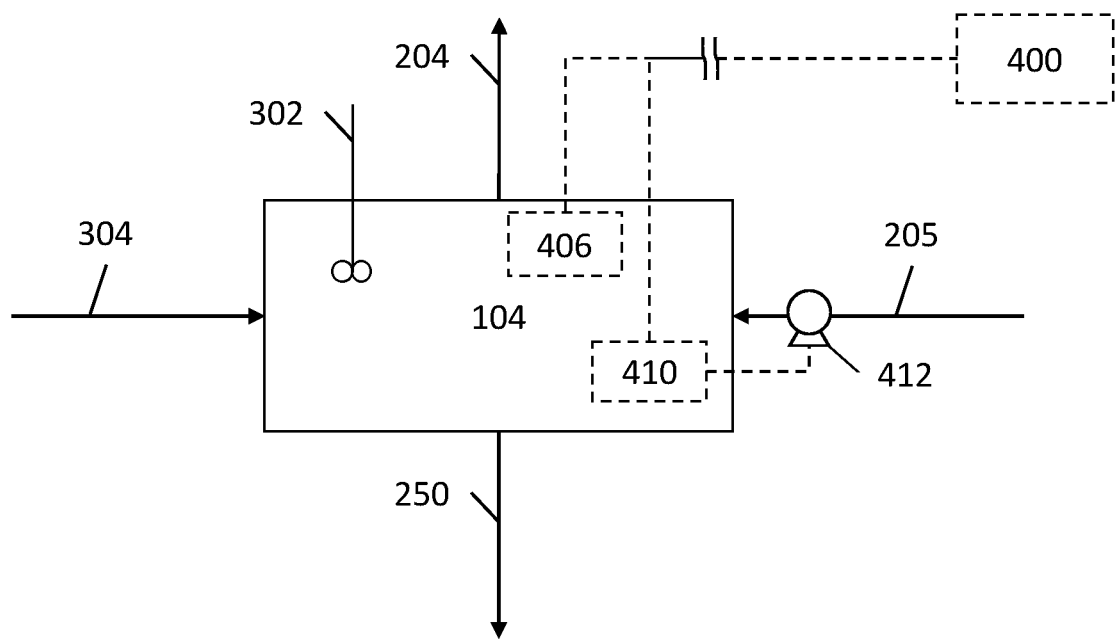
FIG. 3 is a schematic of a reactor for a recirculating aquaculture system (RAS) in accordance with one embodiment of the present disclosure.

As depicted in FIG. 3, the first reactor 104 may further include a stirrer 302, a gas flow inlet 304, and a dissolved oxygen controller 306 that controls air flow and stirrer speed as well as gas flow through the gas flow inlet 304 for sparging gasses such as nitrogen in order to maintain proper anoxic conditions within the first reactor 104. To maintain the correct carbon to nitrogen (C/N) ratio, a controller is added for precise dosing of the carbon source. The flow rates in and out of the first reactor 104 may be controlled by a first motor controller 410 configured to operate pump 412. The recycling 250 and disposal 154 of biofloc may be handled by a wastage floc controller.

The Second Reactor

The second reactor 106 is connected to the main tank 102 in order to transfer an inlet stream 206 and an outlet stream 207. The second reactor 106 is a reactor configured to oxidize ammonia and nitrite, such as a conventional moving bed biofilm reactor (MBBR) filter for aerobic nitrification.

The second reactor 106 contains sensors 402 to monitor pH, ORP, OUR (oxygen uptake rate), water temperature, mass+protein content of the added feed, biofilm growth rates, denitrification rate, BOD and COD accumulation, and others.

Figure 4:
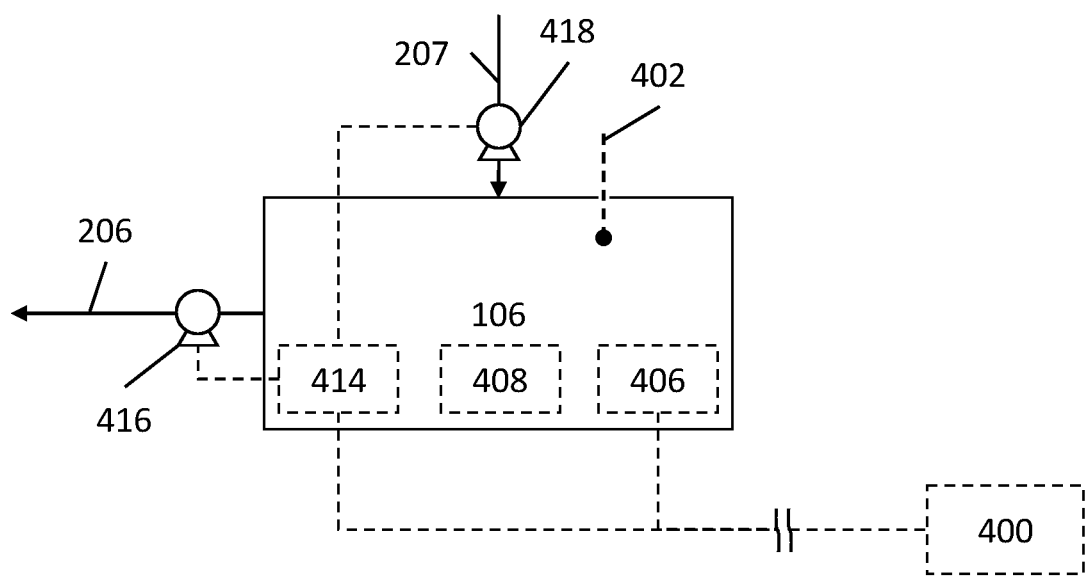
FIG. 4 is a schematic of a reactor for a recirculating aquaculture system (RAS) in accordance with one embodiment of the present disclosure.

As depicted in FIG. 4, the second reactor 106 also includes a dissolved oxygen controller 406 and a pH controller 408 for dosing alkalinity that is consumed during nitrification. The flow rates in and out the MBBR are controlled by a second motor controller 414 configured to operate pumps 416, 418. The second reactor 106 is equipped with sensors 402 and dosing pumps to cultivate a monitored biomass known as a biofloc.

Feed

Figure 2:
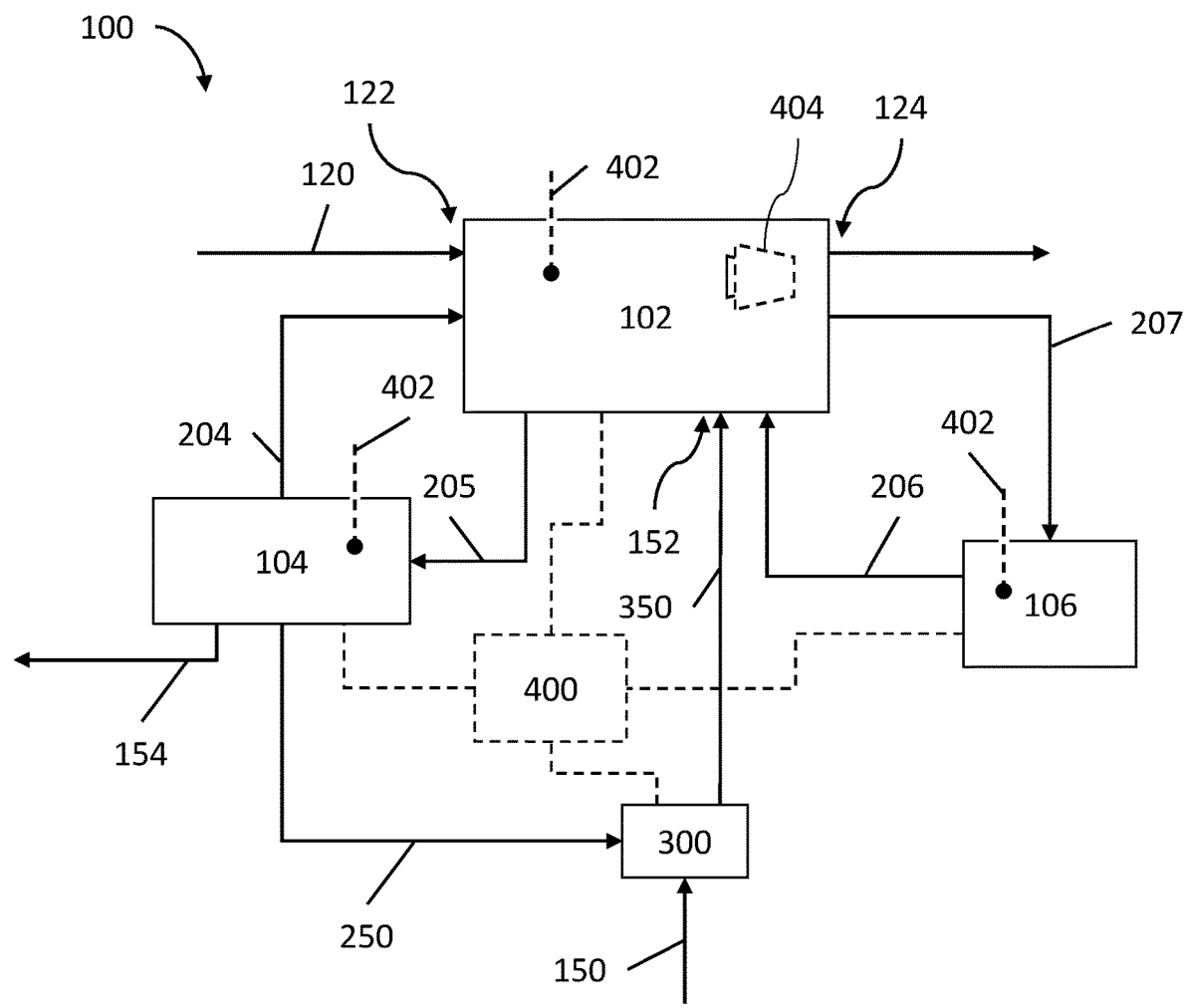
FIG. 2 is a schematic of a recirculating aquaculture system (RAS) in accordance with one embodiment of the present disclosure.

In some embodiments, such as the embodiment depicted in FIG. 2, the feed stream 150 and biofloc recycling stream 250 combine in a feed control 300. The feed control 300 adjusts the amount of feed and recycled biofloc, ratio of feed and recycled biofloc, and allows the feed stream and biofloc recycling stream to mix into a combined feed stream 350 before entering the main tank.

Data-Driven Controller

In some embodiments, the data-driven controller 400 has a processor operably connected to the first reactor, second reactor, and the feed stream. The data-driven controller 400 is configured to bring and maintain the RAS at a desired state. The data-driven controller 400 is operably connected to one or more pumps and one or more control valves in the first reactor 104, second reactor 106, main tank 102, and/or feed stream 150. These pumps control the flow rate of various streams. The data-driven controller 400, via its operable connection to the pumps, may control the rate of the flow-through water change 120, the inlet stream 204, the outlet stream 205, the inlet stream 206, outlet stream 207, feed stream 150, or combined feed stream 350. Further, in order to properly allow the first reactor 104 to operate as a batch reactor, control valves positioned at all inlets and outlets are configured to be controlled by the data-driven controller 400. The data-driven controller 400, using a model of the RAS and data-driven iterative optimization using machine learning, opens and closes the control valves in order to allow the system to flow as necessary. The data-drive controller 400, for example, may pump an outlet stream 205 containing waste, such as nitrate or other pollutants like as phosphate, through the outlet to the first reactor 104 to react in batches by opening and closing the control valves.

That which is claimed is:

1. A recirculating aquaculture system (RAS) comprising:
a main tank;
a first reactor fluidically connected to the main tank, wherein the first reactor is a batch reactor that operates under anoxic conditions;
a second reactor fluidically connected to the main tank, wherein the second reactor is a moving bed biofilm reactor (MBBR);
a feed stream fluidically connected to the main tank; and
a data-driven controller operably connected to the first reactor, the second reactor, and the feed stream, wherein the data-driven controller is configured to bring and maintain the system at a desired state,
wherein the first reactor comprises a first motor controller connected to the data-driven controller to control the outlet stream from the main tank and to control the inlet stream to the first reactor, and wherein the second reactor comprises a second motor controller connected to the data-driven controller to control the outlet stream from the main tank and to control the inlet stream to the second reactor.

2. The recirculating aquaculture system (RAS) of claim 1, further comprising:
at least one sensor in at least one of the main tank, the first reactor, and the second reactor configured to measure at least one of pH, oxygen reduction potential (ORP), dissolved oxygen (DO), temperature, feed concentration, mass+protein content, oxygen uptake rate (OUR), ammonia, nitrite, nitrate, phosphate, COD levels, levels of biofloc in the first reactor, levels of biofilm in the second reactor, and/or feed input, wherein the at least one sensor is operably connected to the data-driven controller.

3. The recirculating aquaculture system (RAS) of claim 1, further comprising at least one camera configured to view at least one of the main tank, the first reactor, and the second reactor, wherein the camera is operably connected to the data-driven controller.

4. The recirculating aquaculture system (RAS) of claim 1, wherein the first reactor further comprises:
a stirrer;
a gas flow inlet; and
a dissolved oxygen controller attached to the first reactor and connected to the data-driven controller, wherein the dissolved oxygen controller is configured to control (i) air flow by sparging nitrogen or carbon dioxide, and (ii) control stirrer speed.

5. The recirculating aquaculture system (RAS) of claim 1, wherein the data-driven controller is configured to monitor and control biofloc in the first reactor and biofilm in the second reactor.

6. The recirculating aquaculture system (RAS) of claim 1, further comprising a feed control configured to adjust an amount and ratio of feed and recycled biofloc, wherein the data-driven controller is configured to control a carbon source by adjusting the feed control.

7. The recirculating aquaculture system (RAS) of claim 1, wherein the second reactor further comprises a dissolved oxygen controller connected to the data-driven controller, and a pH controller for controlling alkalinity.

8. The recirculating aquaculture system (RAS) of claim 1, wherein the data-driven controller is configured to bring and maintain the system at the desired state by using a model of the RAS and data-driven iterative optimization using machine learning.

9. A method of operating a recirculating aquaculture system (RAS) comprising:
farming fish or shellfish in a main tank, which has a feed stream fluidically connected thereto;
operating a first reactor under anoxic conditions, the first reactor being fluidically connected to the main tank;
operating a second reactor, which is a moving bed biofilm reactor (MBBR) fluidically connected to the main tank;
operating a data-driven controller connected to the first reactor, the second reactor, and the feed stream, to bring and maintain the system at a desired state;
controlling, via a first motor controller connected to the data-driven controller, the outlet stream from the main tank and the inlet stream to the first reactor; and
controlling, via a second motor controller connected to the data-driven controller, the outlet stream from the main tank and the inlet stream to the second reactor.

10. The method of claim 9, further comprising:
measuring, via at least one sensor in at least one of the main tank, the first reactor, and the second reactor, one or more variables selected from at least one of pH, oxygen reduction potential (ORP), dissolved oxygen (DO), temperature, feed concentration, mass+protein content, oxygen uptake rate (OUR), ammonia, nitrite, nitrate, phosphate, COD levels, levels of biofloc in the first reactor, levels of biofilm in the second reactor, and/or feed input; and
relaying the measured variable to the data-driven controller.

11. The method of claim 10, further comprising monitoring and controlling, via the data-driven controller, biofloc in the first reactor and biofilm in the second reactor.

12. The method of claim 11, further comprising adjusting, via the data-driven controller, an amount and ratio of feed and recycled biofloc.

13. The method of claim 9, further comprising controlling dissolved oxygen and alkalinity in the main tank and/or second reactor.

14. The method of claim 9, wherein the data-driven controller uses a model of the RAS and data-driven iterative optimization using machine learning to bring and maintain the RAS at the desired state.

15. A recirculating aquaculture system (RAS) comprising:
a main tank;
a first reactor fluidically connected to the main tank, wherein the first reactor is a batch reactor that operates under anoxic conditions;
a second reactor fluidically connected to the main tank, wherein the second reactor is a moving bed biofilm reactor (MBBR);
a feed stream fluidically connected to the main tank;
a plurality of sensors in the main tank, the first reactor, and/or the second reactor configured to measure two or more of pH, oxygen reduction potential (ORP), dissolved oxygen (DO), temperature, feed concentration, mass+protein content, oxygen uptake rate (OUR), ammonia, nitrite, nitrate, phosphate, COD levels, levels of biofloc in the first reactor, levels of biofilm in the second reactor, and/or feed input; and
a data-driven controller operably connected to the first reactor, the second reactor, the feed stream, and the plurality of sensors,
wherein the data-driven controller is configured to bring and maintain the RAS at a desired state by using a model of the RAS and data-driven iterative optimization using machine learning,
wherein the data-driven controller is configured to control, via a first motor controller connected to the data-driven controller, the outlet stream from the main tank and the inlet stream to the first reactor, and
wherein the data-driven controller is configured to control via a second motor controller connected to the data-driven controller, the outlet stream from the main tank and the inlet stream to the second reactor.

* * * * *